G. W. BOLDEN.
TROLLEY GUIDE BOX AND SHIELD.
APPLICATION FILED JAN. 31, 1918.
1,341,878.
Patented June 1, 1920.
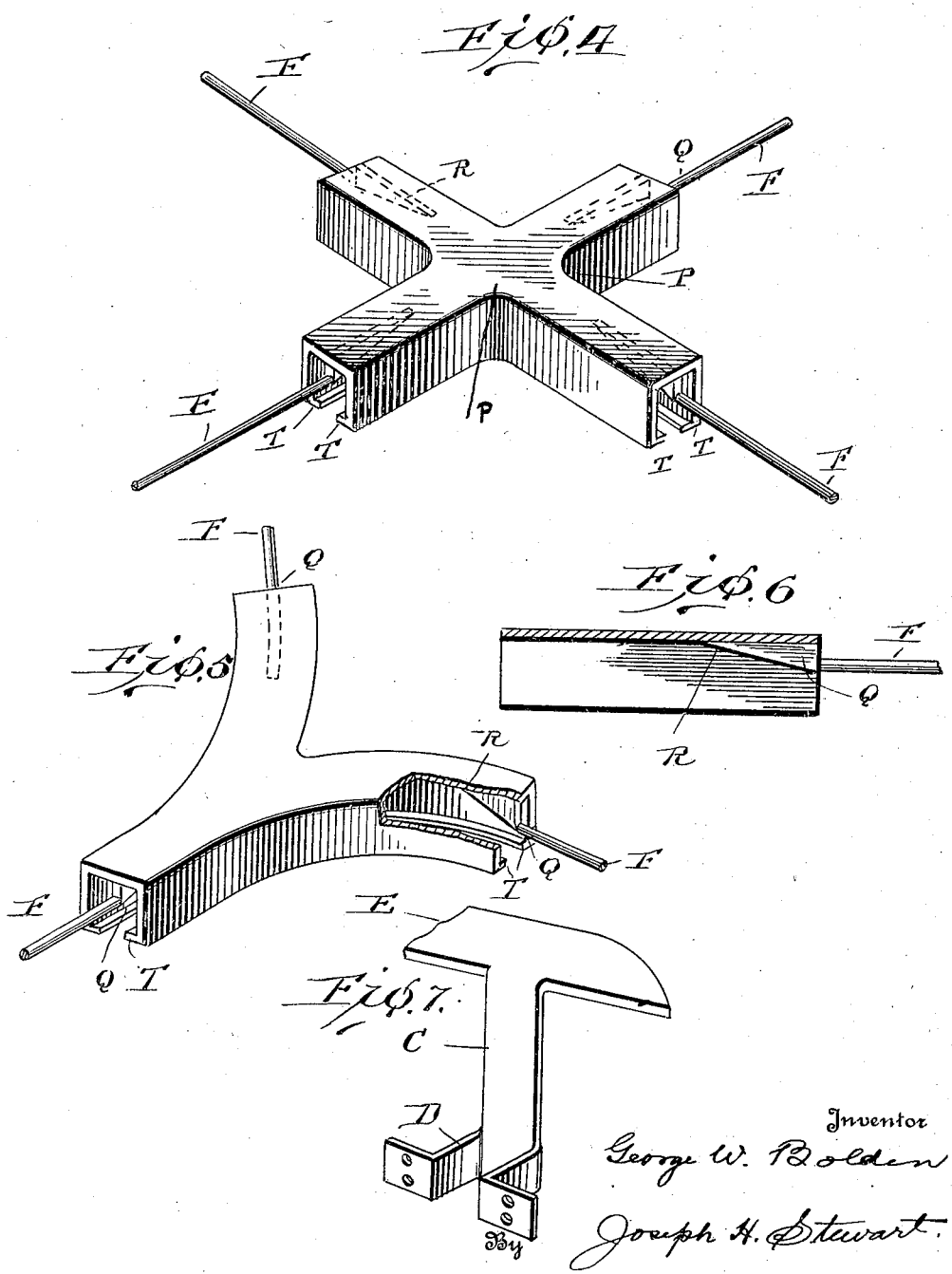

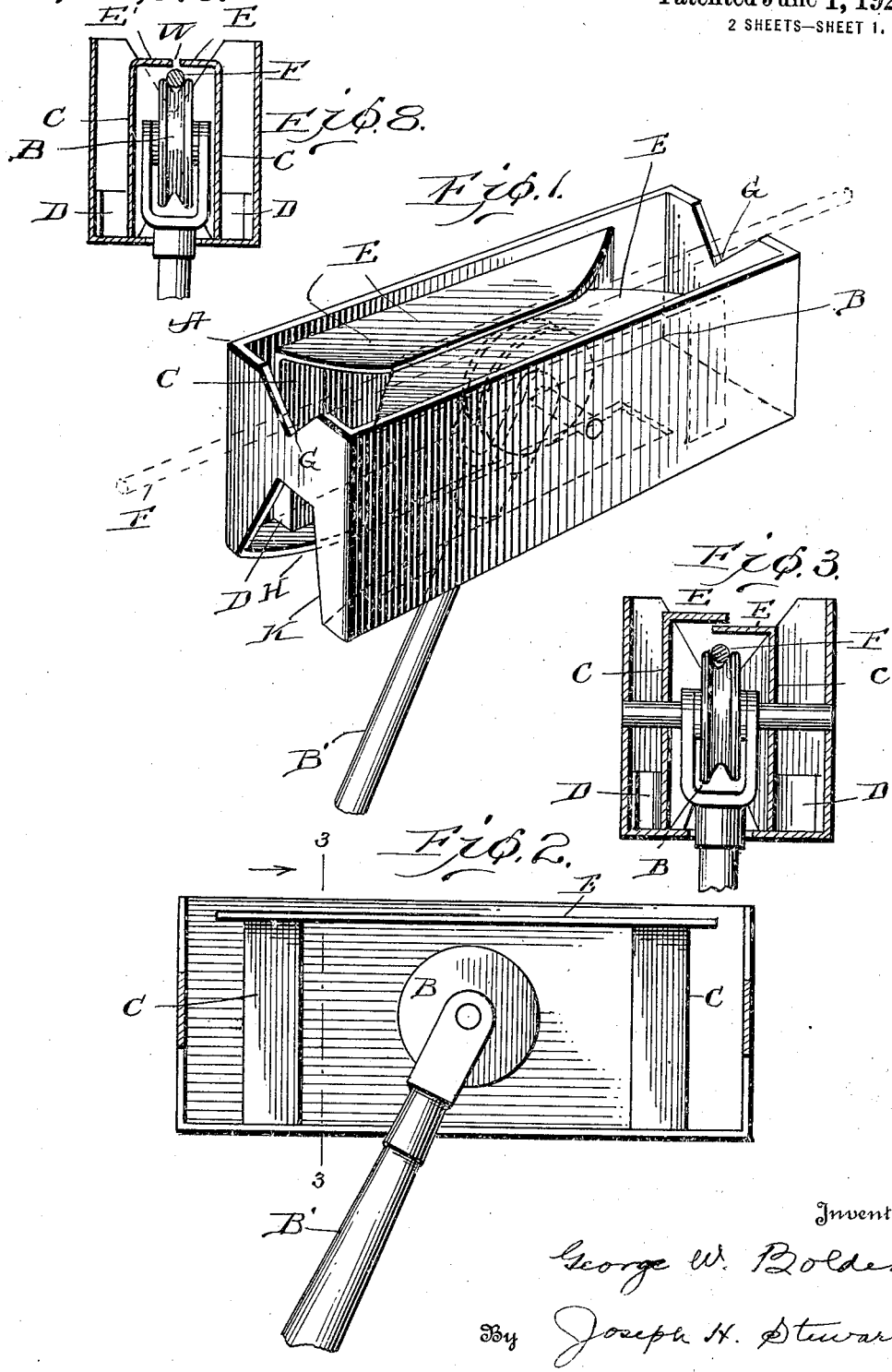

UNITED STATES PATENT OFFICE.

GEORGE W. BOLDEN, OF PHILADELPHIA, PENNSYLVANIA.

TROLLEY-GUIDE BOX AND SHIELD.

1,341,878.  Specification of Letters Patent.  Patented June 1, 1920.

Application filed January 31, 1918. Serial No. 214,643.

*To all whom it may concern:*

Be it known that I, GEORGE W. BOLDEN, a citizen of the United States, residing at Philadelphia, in the county of Philadelphia and State of Pennsylvania, have invented certain new and useful Improvements in Trolley-Guide Boxes and Shields, of which the following is a specification.

My invention relates to new and useful improvements in trolley guide boxes and shields.

The object of my invention is to provide a trolley guide box adapted to contain within its inclosure the trolley wheel and mechanism to prevent the trolley wheel at all times and occasions from becoming disengaged from the over head conductor also to provide shields for the use of the same at street crossings, at switches, at curves, at the car barn or at the terminal of the line.

In the accompanying drawings, Figure 1, is a perspective view of my trolley guide box. Fig. 2, is a longitudinal vertical sectional view of the same. Fig. 3, is a cross section taken centrally of Fig. 2. Fig. 4, is a perspective view of the shield used in connection with my device and employed at crossings. Fig. 5, is a similar view illustrating my shield employed at a switch or branch line. Fig. 6, is a detail sectional view of a form of shield employed at the terminal of a line. Fig. 7, is a detail perspective view of one end of the safety plate, springs and spring supporter, and Fig. 8, is a cross sectional view showing a different arrangement of the safety plates from that employed in Fig. 3.

Throughout the specification and drawings, similar reference characters indicate corresponding parts.

In the drawings, A represents my trolley guide box rectangular in shape constructed of metal or other suitable material and adapted to have within its inclosure the trolley wheel B and its mechanism, also spring supporters D, D, secured to the sides of the box near the bottom by countersink screws or other suitable means and supporting springs C, C, which are crowned by safety plates E, E, secured to the springs by suitable means and over lapping one another at the top of the box thereby preventing the escape of the over head conductor from the trolley wheel in the movements of the trolley car. The trolley wire or over head conductor F, passes under the safety plates E, E, and out at each end of the box through the triangular shaped cut out G, G, as the trolley guide box is carried along the over head conductor by the trolley wheel as the car moves over the track.

B' represents the trolley pole which works in the slot K, in the bottom of the trolley guide box A, beginning more than half way to the rear thereof and running toward the front widening into the cut out H, as shown at the bottom front end in Fig. 1. When the trolley car crosses bridges or passes through tunnels or other places where the height of the over head conductor is not as great as it ordinarily is on the streets of the city, sufficient space is allowed for the trolley pole to operate in the slot K, and the cut out H, so that the pole may easily adjust itself to the height of the over head conductor.

P, represents my trolley guide shield which is constructed of metal adapted to carry the electric current and is used at street crossings. The trolley guide box is carried along the over head conductor by the trolley wheel to the entrance of the shield where the wire is secured to the lower edge of the metal wedge Q, also adapted to carry the electric current. The wedge Q, is secured to the roof of the shield by screws or other suitable means. When the trolley guide box reaches the entrance of the shield, the triangular cut out G, G, allows the wedge to pass over the safety plates and out of the box. The trolley guide box passes under the roof of the shield on each side of the wedge Q, the bottom of the trolley guide box passes over the inwardly projecting flanges T, T, which are secured by suitable means to the lower edge of the shield until the trolley wheel engages the thin portion of the wedge R, going to the thick part thereof at Q, where the over head conductor is again engaged by the trolley wheel and the movement of the trolley car is continued.

When the trolley car enters a switch or a curve, I use a form of shield for the trolley guide box as shown in Fig. 5, with inwardly projecting flanges T, T, following the turn of the shield over which the trolley guide box travels in passing through the shield in the manner above described.

At the terminal of the line or at the car barn, I use a form of shield differing from the shields already described by the absence of the inwardly projecting flanges. The absence of the inwardly projecting flanges in the shields used at the terminal of the line or at the car barn enables the persons operating the trolley car to pull or detach the trolley guide box from the shield for any purpose desired. The trolley guide box carrying over lapping safety plates cannot be detached from the over head conductor at any point except where the form of shield is used as shown in Fig. 6.

I also provide safety plates differing in position and arrangement from that shown in Fig. 3. Should it become desirable or necessary to remove the trolley guide box from the over head conductor at any point on the line between the shields, I employ safety plates with shorter blades than those shown in Fig. 3, and arrange the inner edges so that the safety plates will be horizontal as shown in Fig. 8, with an open space W, between them sufficiently close to prevent the free or easy passage of the trolley wire through the opening W, by the ordinary vibration or rocking of the car on the tracks and yet sufficiently large to permit the persons operating the car to forcibly pull the trolley guide box down from the trolley wire and also to permit the placing of the trolley wire again under safety plates as desired.

Having thus described my invention what I claim, and desire to secure by Letters Patent of the United States, is—

A trolley guide box shield having inwardly projecting flanges on its lower edges, a triangular member secured to the roof thereof, an over head wire secured to the thick end of the triangular member at its lower edge and adapted to allow the free passage through the shield of the triangular cut out and the upper portion of a trolley guide box on each side of the triangular member and of the bottom of the trolley guide box over the inwardly projecting flanges.

In testimony whereof I affix my signature in the presence of two witnesses.

GEORGE W. BOLDEN.

Witnesses:
H. P. JOHN,
FRANK A. ROMMEL.